(12) United States Patent
Kubo et al.

(10) Patent No.: US 6,257,529 B1
(45) Date of Patent: Jul. 10, 2001

(54) SERVO ACTUATOR APPARATUS AND AIRCRAFT CONTROL APPARATUS

(75) Inventors: Yoshiharu Kubo; Takeshi Tomio, both of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/461,744

(22) Filed: Dec. 16, 1999

(30) Foreign Application Priority Data

Mar. 18, 1999 (JP) .................................................. 11-074427

(51) Int. Cl.[7] .................................................... B64C 13/04
(52) U.S. Cl. .......................... 244/221; 244/194; 318/564; 701/4
(58) Field of Search ..................................... 244/194, 195, 244/221; 318/564, 555, 556; 701/3, 4, 8

(56) References Cited

U.S. PATENT DOCUMENTS

| 3,395,615 | * | 8/1968 | Taylor . |
| 3,454,852 | * | 7/1969 | Bourne et al. ........................ 244/194 |
| 3,500,149 | * | 3/1970 | Moses et al. . |
| 3,719,336 | * | 3/1973 | Fowler et al. ........................ 244/194 |
| 3,920,966 | * | 11/1975 | Knemeyer et al. . |
| 4,035,705 |   | 7/1977 | Miller . |
| 4,095,763 | * | 6/1978 | Builta . |
| 4,209,734 | * | 6/1980 | Osder . |
| 4,599,698 |   | 7/1986 | Fischer et al. . |

FOREIGN PATENT DOCUMENTS

| 51-116600 | 10/1976 | (JP) . |
| 59-209997 | 11/1984 | (JP) . |
| 3-16896 | 1/1991 | (JP) . |
| 10-510782 | 10/1998 | (JP) . |
| 96/19380 | 6/1996 | (WO) . |

\* cited by examiner

*Primary Examiner*—Charles T. Jordan
*Assistant Examiner*—Tien Dinh
(74) *Attorney, Agent, or Firm*—Wenderoth, Lind & Ponack L.L.P.

(57) ABSTRACT

A servo actuator apparatus has: an actuator which relatively displaces an operation unit on the basis of an input signal E1; a position sensor which detects a relative position of the operation unit and outputs a detection signal D1; an actuator which relatively displaces an operation unit on the basis of an input signal E2; a position sensor which detects a relative position of the operation unit and outputs a detection signal D2; a difference calculation unit which subtracts the detection signal D2 from a command signal C1 supplied from a flight control computer, to output the input signal E1; and a difference calculation unit which subtracts the detection signal D1 from a command signal C2 supplied from a flight control computer, to output the input signal E2, where a positive displacement direction of the operation unit is reverse and series to that of the operation unit, and the body units of the actuators are integrally movable, and the actuators can always operate while mutually monitoring the actual operation, and have a function that, when one of the actuators fails and falls in hardover, the other actuator immediately corrects the hardover. In this way, prevention of a hardover or suppression of the degree of a hardover can be realized by a simple configuration.

3 Claims, 3 Drawing Sheets

000# SERVO ACTUATOR APPARATUS AND AIRCRAFT CONTROL APPARATUS

BACKGROUND OF THE INVENTION

1. Field of the Invention

The invention relates to a duplicate type servo actuator apparatus which causes an operation unit to be displaced on the basis of an input signal, and also to an aircraft control apparatus which uses such a duplicate type servo actuator apparatus.

2. Description of the Related Art

In an aircraft such as a helicopter, a servo actuation system of a hydraulic, electric or electrohydraulic type is used in a control system, a stability augmentation system (SAS), and an automatic flight control system (AFCS).

Such a servo actuation system is provided with various countermeasures against hardover. In a system of the mechanical hydraulic type, duplicate spools of a hydraulic control valve and the like are used to realize multiplication of the mechanical and hydraulic systems. In a system of the electric or electrohydraulic type are employed the following countermeasures: 1) the maximum operation amount is restricted so as to exist within such a range that the flight safety is not critically affected even when a hardover occurs; and 2) the system is multiplied to be redundantly managed so that the probability of occurrence of hardover is suppressed to an allowable value or less.

As the performance and function of aircraft such as a helicopter are made higher, mechatronics systems are more frequently used. Therefore, it has been studied that a system is highly multiplied to expand an operable range while the maximum operation amount is not limited too much. In particular, triple or quadruple multiplication of a Fly-By-Wire control system, SAS, AFCS or the like realizes the following: a) the probability of function loss (including hardover) suppressed to $10^{-9}$ times/hour in commercial planes or $10^{-7}$ times/hour in military planes; b) specification of the probability of function loss (including hardover) corresponding to the failure influence request level (e.g., $10^{-5}$ times/hour); and c) a failure influence suppression (fail passive, fail soft, fail safe) and separation from a failure system.

As higher redundancy is made by multiplication of a system, higher the flight safety is improved. However, such multiplication causes the system to be complicated and increased in size, and cost.

SUMMARY OF THE INVENTION

It is an object of the invention to provide a servo actuator apparatus and an aircraft control apparatus, in which anti-hardover or hardover-degree suppression can be realized with a simple configuration thereof.

The invention provides a servo actuator apparatus comprising:

a first actuator for relatively displacing a first operation unit relatively with respect to a first body unit on the basis of an input signal E1;

a first position sensor for detecting a position of the first operation unit with respect to the first body unit and outputting a detection signal D1;

a second actuator for displacing a second operation unit relatively to respect to a second body unit on the basis of an input signal E2;

a second position sensor for detecting a position of the second operation unit with respect to the second body unit and outputting a detection signal D2;

a first difference calculation unit for subtracting the detection signal D2 of the second position sensor from an external command signal C1, and outputting the input signal E1; and a second difference calculation unit for subtracting the detection signal D1 of the first position sensor from an external command signal C2, and outputting the input signal E2, wherein a positive displacement direction of the first operation unit is reverse and series to a positive displacement direction of the second operation unit, and the first and second body units are integrally movable.

According to the invention, the first actuator operates on the basis of the input signal E1 obtained by subtracting the detection signal D2 of the second position sensor from the command signal C1, and the second actuator operates on the basis of the input signal E2 obtained by subtracting the detection signal D1 of the first position sensor from the command signal C2. The first body unit of the first actuator and the second body unit of the second actuator are integrally movable, and the positive displacement direction of the first operation unit is set to be reverse and series to that of the second operation unit. Therefore, the total displacement amount Q of the first and second operation units is proportional to the total of the command signals C1 and C2. The positive displacement direction of the respective operation units means an operation direction in the case where the command signal is increased in a positive direction.

Herein a first system of the first actuator and the command signal C1 and a second system of the second actuator and the command signal C2 have the same functions and performances in a double configuration, namely a duplicate redundant system.

First, the basic operation (the operation in a normal operation state in which no failure occurs) of the invention will be described. The external command signals C1 and C2 have basically identical values, and respectively serve as a displacement amount (operation amount) by which the actuator apparatus is to be moved in response to a command. Accordingly when the operation amount of the first actuator based on C1 is simply added to that of the second actuator based on C2, the operation amount of the whole of the servo actuation system reaches to twice the required amount. Therefore, the operation command of the first actuator is switched to E1 obtained by subtracting D2 from C1, and that of the second actuator is switched to E2 obtained by subtracting D1 from C2, so that the operation amount E of the whole of the servo actuation system is calculated as E=E1+E2=(C1−D2)+(C2−D1)=(C1+C2)−(D1+D2). Furthermore, since (D1+D2) during a time period from the start of the operation of the servo actuation system to the end of the operation is equal to C1 (or C2 having an equivalent value), the servo actuation system eventually operates in accordance with the command signal C1 (or C2).

Consequently, the first and second operation units are displaced in proportion to the increments of the command signals C1 and C2. As a result, the actuator apparatus operates in the same manner as a signal actuator.

Next, assuming that any portion of the first system including the first actuator fails and the operation of the first actuator falls in hardover, the detection signal D1 obtained by detecting the actual operation of the first actuator has a value in which a deviation due to the hardover is added to (or subtracted from) the value during the normal operation. The detection signal D1 is corrected with respect to the command signal C2 of the second actuator in the direction opposite to the deviation direction, resulting in (C2−D1).

Accordingly, the second actuator operates while correcting in real time the deviation (hardover amount) of the operation of the first actuator. To the contrary, when the second actuator falls in hardover, the first actuator operates in the same manner as the second actuator described above.

In this way, the first and second actuators can monitor each other while the actuators are always maintained in the operation state, and, when one of the actuators falls in hardover, the other actuator can correct the hardover in real time. As a result, a duplication system can be realized without requiring a complex mechanism such as a complicated fault detection mechanism, or a mechanism for switching over the first and second actuators.

The servo actuator apparatus of the invention can be applied to all kinds of servo actuation systems such as a control system of aircraft including a helicopter or a fixed wing aircraft, and construction machinery, and others.

In the invention it is preferable that differential circuits are respectively interposed between the second position sensor and the first difference calculation unit, and between the first position sensor and the second difference calculation unit.

According to the invention, a differential circuit is disposed in the output side of each of the position sensors. Therefore, the first actuator can hasten its initial response in accordance with the operation rate of the second operation unit, and the second actuator can hasten its initial response in accordance with the operation rate of the first operation unit, with the result that the servo actuator can operate as a whole in quick response.

The invention provides an aircraft control apparatus comprising:

- a first actuator for displacing a first operation unit relatively to a first body unit on the basis of an input signal E1,;
- a first position sensor for detecting a position of the first operation unit with respect to the first body unit and outputting a detection signal D1;
- a second actuator for displacing a second operation unit relatively to a second body unit on the basis of an input signal E2;
- a second position sensor for detecting a position of the second operation unit with respect to the second body unit and outputting a detection signal D2;
- a first difference calculation unit for subtracting the detection signal D2 of the second position sensor from a command signal C1 supplied from a first flight control computer, and outputting the input signal E1; and
- a second difference calculation unit for subtracting the detection signal D1 of the first position sensor from a command signal C2 supplied from a second flight control computer, and outputting the input signal E2,
- wherein a positive displacement direction of the first operation unit is reverse and series to a positive displacement direction of the second operation unit, and the first and second body units are integrally movable,
- wherein a control unit controlled by a pilot is coupled to one of the first and second operation units, and
- wherein another one of the first and second operation units is coupled to a steering mechanism for generating an aerodynamic control force.

According to the invention, the first actuator operates on the basis of the input signal E1 obtained by subtracting the detection signal D2 of the second position sensor from the command signal C1, and the second actuator operates on the basis of the input signal E2 obtained by subtracting the detection signal D1 of the first position sensor from the command signal C2. The first body unit of the first actuator and the second body unit of the second actuator are integrally movable, and the positive displacement direction of the first operation unit is set to be reverse and series to that of the second operation unit. Therefore, the total displacement amount Q of the first and second operation units is proportional to the total of the command signals C1 and C2. The positive displacement direction of each operation unit means an operation direction in the case where the command signal is increased in a positive direction.

Herein a first system of the first actuator and the command signal C1 and a second system of the second actuator and the command signal C2 have the same functions and performances in a double c on figuration, namely a duplicate redundant system.

First, the basic operation (the operation in a normal operation state in which no failure occurs) of the invention will be described. The external command signals C1 and C2 have basically identical values, and respectively serve as a displacement amount (operation amount) by which the actuator apparatus is to be moved in response to a command. Accordingly when the operation amount of the first actuator based on C1 is simply added to that of the second actuator based on C2, the operation amount of the whole of the servo actuation system reaches to twice the required amount. Therefore, the operation command of the first actuator is switched to E1 obtained by subtracting D2 from C1, and that of the second actuator is switched to E2 obtained by subtracting D1 from C2, so that the operation amount E of the whole of the servo actuation system is calculated as E=E1+E2=(C1−D2)+(C2−D1)=(C1+C2)−(D1+D2). Furthermore, since (D1+D2) during a time period from the start of the operation of the servo actuation system to the end of the operation is equal to C1 (or C2 having an equivalent value). The servo actuation system eventually operates in accordance with the command signal C1 (or C2).

Consequently, the first and second operation units are displaced in proportion to the increment of the command signal C1 supplied from the first flight control computer, and that of the command signal C2 supplied from the second flight control computer. As a result, the apparatus operates in the same manner as a signal actuator.

Next, assuming that any portion of the first system including the first flight control computer to the first actuator fails and the operation of the first actuator falls in hardover, the detection signal D1 obtained by detecting the actual operation of the first actuator has a value in which a deviation due to the hardover is added to (or subtracted from) the value during the normal operation. The detection signal D1 is corrected with respect to the command signal C2 of the second actuator in the direction opposite to the deviation direction, resulting in (C2−D1). Accordingly, the second actuator operates while correcting in real time the deviation (hardover amount) of the operation of the first actuator. To the contrary, when the second actuator falls in hardover, the first actuator operates in the same manner as the second actuator described above.

In this way, the first and second actuators can monitor each other while the actuators are always maintained in the operation state, and, when one of the actuators falls in hardover, the other actuator can correct the hardover in real time. As a result, a duplication system can be realized without requiring a complex mechanism such as a complicated fault detection mechanism, or a mechanism for switching over the first and second actuators.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
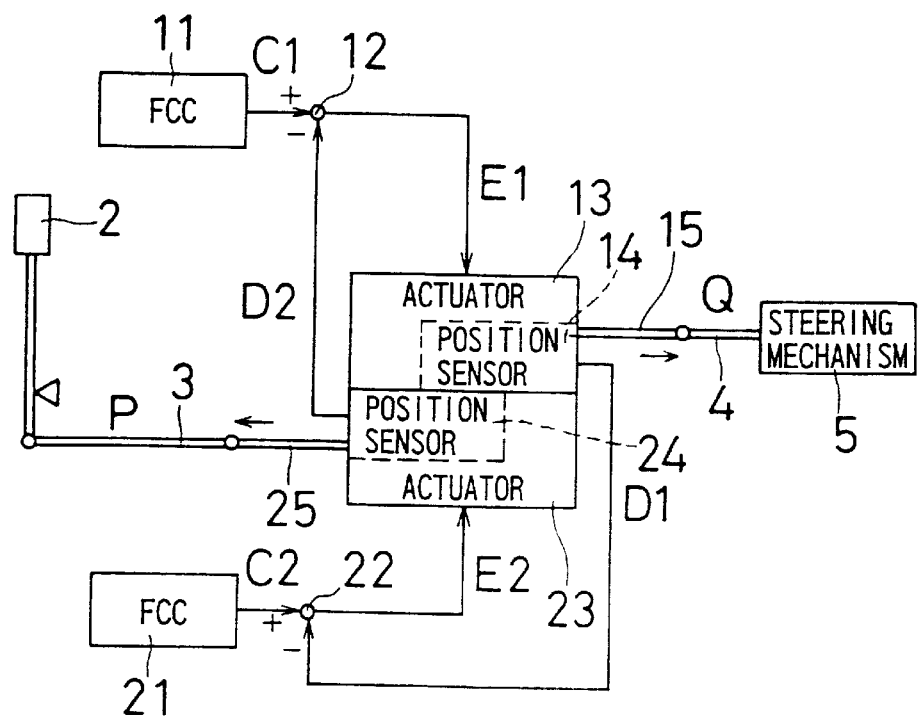
FIG. 1 is a block diagram showing an embodiment of the invention.

Now referring to the drawings, preferred embodiments of the invention are described below.

FIG. 1 is a block diagram showing an embodiment of the invention. A control unit 2 including pilot-operated control levers or control pedals is coupled to an operation unit 25 of an actuator 23 via a mechanical link mechanism 3. The body units of actuators 13 and 23 are integrally movable. An operation unit 15 of the actuator 13 is coupled to a steering mechanism 5 via a mechanical link mechanism 4. The steering mechanism 5 controls blade pitch angles of a main rotor or a tail rotor, and controls an aerodynamic control force, so as to control the flight direction and attitude of a helicopter. The positive displacement direction (the rightward direction in FIG. 1) of the operation unit 15 is set to be reverse and parallel to the positive displacement direction (the leftward direction in FIG. 1) of the operation unit 25. In this way, the control unit 2, the link mechanism 3, the operation unit 25, the actuator 23, the actuator 13, the operation unit 15, the link mechanism 4, and the steering mechanism 5 are arranged in this sequence to form a control transmission system. The actuators 13 and 23 are arranged in series.

A position sensor 14 is incorporated into the actuator 13 to detect the position of the operation unit 15 with respect to the body unit of the actuator 13, and outputs a detection signal D1. Similarly, a position sensor 24 is incorporated into the actuator 23 to detect the position of the operation unit 25 with respect to the body unit of the actuator 23 to output a detection signal D2.

Flight control computers (FCCs) 11 and 21 calculate a flight-control-law, and simulate a flight control model of the helicopter based on signals from various sensors such as an altimeter and an attitude sensor, thereby executing a model calculation. In the embodiment, the computers output command signals C1 and C2 for controlling the actuators 13 and 23, respectively. The command values of C1 and C2 are basically equal to each other.

A difference calculation unit 12 is interposed between the flight control computer 11 and the actuator 13, so as to supply an input signal E1 obtained by subtracting the detection signal D2 of the position sensor 24 from the command signal C1 of the flight control computer 11, to the actuator 13. Similarly, a difference calculation unit 22 is interposed between the flight control computer 21 and the actuator 23, so as to supply an input signal E2 obtained by subtracting the detection signal D1 of the position sensor 14 from the command signal C2 of the flight control computer 21, to the actuator 23.

On the basis of the input signal E1, the actuator 13 relatively displaces the operation unit 15 with respect to the body unit. Similarly, on the basis of the input signal E2, the actuator 23 relatively displaces the operation unit 25 with respect to the body unit.

Next, the operation will be described.

i) When the flight control computer 11 outputs the command signal C1 in a state where the flight control computer 21 does not output the command signal C2, the difference calculation unit 12 subtracts the detection signal D2 of the position sensor 24 from the command signal C1, and supplies a result of the subtraction to the actuator 13 as the input signal E1. The actuator 13 moves the operation unit 15 to a position corresponding to the input signal E1. In this case, D2 is zero, and hence the steering mechanism 5 is finally driven by a displacement amount corresponding to the command signal C1.

ii) When the flight control computer 21 outputs the command signal C2 in a state where the flight control computer 11 does not operate, the difference calculation unit 22 subtracts the detection signal D1 (actually, zero) of the position sensor 14 from the command signal C2, and supplies a result of the subtraction to the actuator 23 as the input signal E2. The actuator 23 moves the operation unit 25 to a position corresponding to the command signal C2.

iii) When the flight control computer 11 outputs the command signal C1 and the flight control computer 21 outputs the command signal C2, the total displacement amount Q of the operation units 15 and 25 is proportional to a value obtained by subtracting in real time the sum of the actual operation amounts D1 and D2 of the operation units 15 and 25, from the total of the command signals C1 and C2, and hence the steering mechanism 5 is finally driven by a displacement amount corresponding to the command signal C1 (or C2).

iv) When the pilot operates the control unit 2, the body units of the actuators 23 and 13 are moved via the link mechanism 3, and the steering mechanism 5 is finally driven by a displacement amount corresponding to the amount P of operation by the pilot, via the link mechanism 4.

v) Assuming that any portion of the first system ranging from the flight control computer 11 to the actuator 13 accidentally fails and the operation of the actuator 13 falls in hardover, the operation unit 15 falls into a state where the unit stops at the maximum displacement position in the positive or negative direction. On the other hand, even in such an event, the operation unit 25 can operate in accordance with the input signal E2 obtained by correcting the command signal C2 under monitoring a hardover of the operation unit 15 in real time. Accordingly the servo actuator is enabled to continue the normal operation only with the second system ranging from the flight control computer 21 to the actuator 23 while canceling the hardover of the first system.

vi) Similarly, assuming that any portion of the second system ranging from the flight control computer 21 to the actuator 23 accidentally fails and the operation of the actuator 23 falls in hardover, the operation unit 25 falls into a state where the unit stops at the maximum displacement position in the positive or negative direction. On the other hand, even in such an event, the operation unit 15 can operate in accordance with the input signal E1 obtained by correcting the command signal C1 under monitoring a hardover of the operation unit 25 in real time. Accordingly the servo actuator is enabled to continue the normal operation only with the first system ranging from the flight control computer 11 to the actuator 13.

Figure 2:
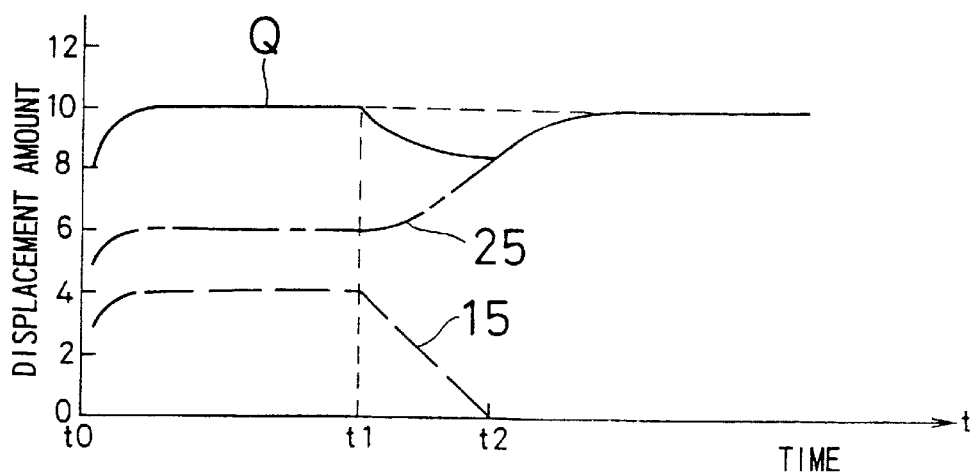
FIG. 2 is a graph illustrating the operation of a servo actuator of FIG. 1.

FIG. 2 is a graph illustrating the operation of the servo actuator of FIG. 1. The ordinate indicates the displacement amount of an operation unit, and the abscissa indicates the time. The broken line shows the displacement amount of the operation unit 15, the one-dot chain line shows the displacement amount of the operation unit 25, and the solid line shows the total displacement amount Q of the operation units 15 and 25. At a time t0, the flight control computers 11 and 21 output the command signals C1 and C2, respectively. Then, the operation units 15 and 25 respond to the signals, so that the operation unit 15 stops at a displacement amount of "4" and the operation unit 25 stops at a displacement amount of "6". As a result, the total displacement amount Q of the units is a displacement amount of "10".

When the first system fails at a time t1 and the actuator 13 falls in hardover, the operation unit 15 starts to move in the negative direction, for example, and, at a time t2, stops at the maximum displacement position under a hardover state. At this time, the movement of the operation unit 15 in the negative direction causes the detection signal D1 of the position sensor 14 to be reduced. To the contrary, the input signal E2 into the actuator 23 is correspondingly increased, and the operation unit 25 starts to move in the positive direction with a response delay of a certain degree, so as to perform an operation which compensates the hardover of the operation unit 15. As a result, the variation of the total displacement amount Q is smaller than that of the operation unit 15, so that the influence of the hardover can be suppressed.

Even after a time t2, the operation unit 25 continues to move in the positive direction. Therefore, the total displacement amount Q can be finally returned to displacement amount of "10" by the actuator 23 alone. In this way, even when one of the first and second systems fails, the normal operation can be maintained by the remaining system.

Figure 3:
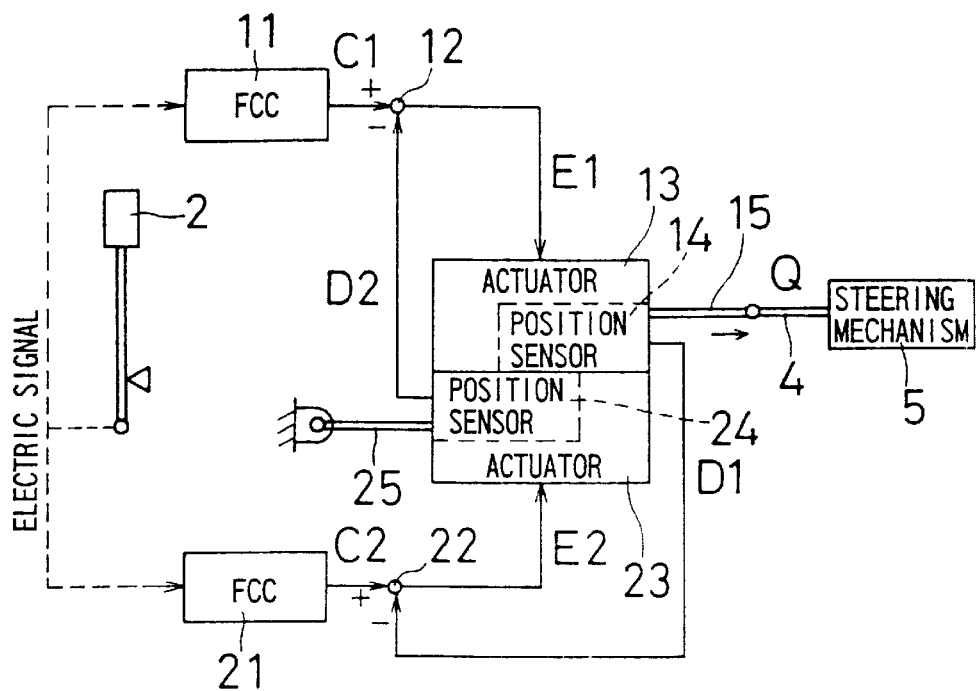
FIG. 3 is a diagram showing an example of application of the invention to a Fly-By-Wire type control apparatus.

FIG. 3 is a diagram showing an example in which the invention is applied to a Fly-By-Wire (FBW) type control system in which a helicopter or fixed wing aircraft is controlled by electric signals. The embodiment is identical with that of FIG. 1 except that the link mechanism 3 of FIG. 1 is omitted, one end of the operation unit 25 is fixed, and the control amount of the control unit 2 is replaced with electric signals and supplied to the flight control computers 11 and 21. The function and effects of the invention are identical with those of FIG. 1.

Figure 4:
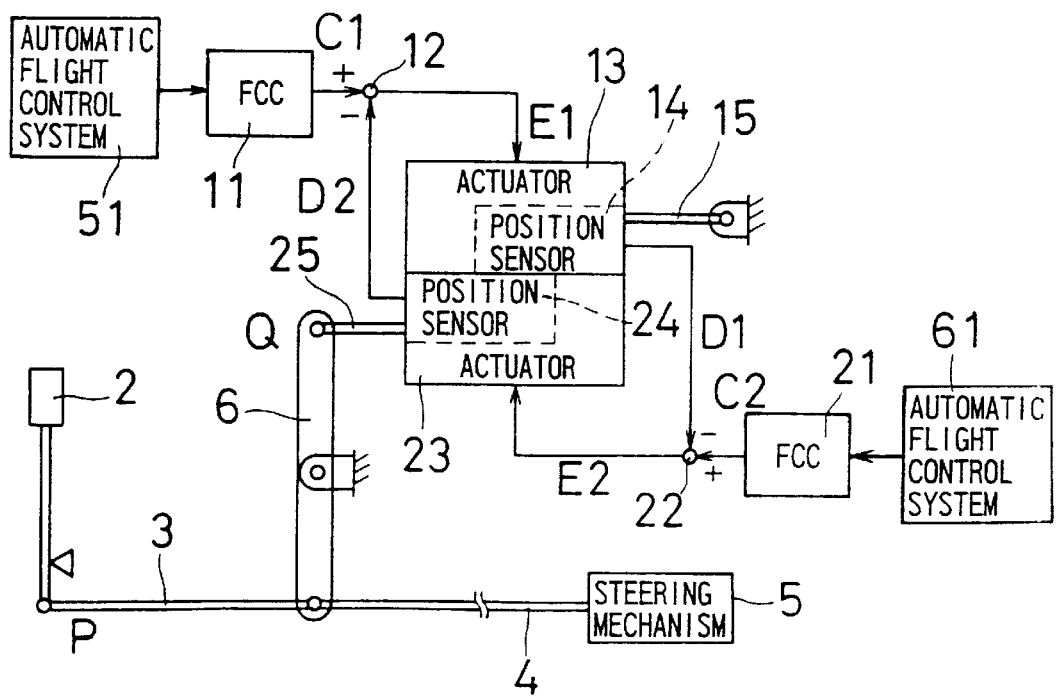
FIG. 4 is a block diagram showing a second embodiment of the invention.

FIG. 4 is a block diagram showing a second embodiment of the invention. The embodiment corresponds to an automatic flight control system for use in helicopters or fixed wing aircraft, whereby the control unit is not operated by the operator's hands. Hereinafter, an example in which a servo actuator apparatus is coupled in parallel to a control transmission system will be described.

A control unit 2 including control levers or control pedals is coupled to a steering mechanism 5 via mechanical link mechanisms 3 and 4. Midpoints of the link mechanisms 3 and 4 are coupled to an output end of another link mechanism 6. An input end of the link mechanism 6 is coupled to an operation unit 25 of an actuator 23. An operation unit 15 of an actuator 13 is fixed so as to be angularly displaceable with respect to the airframe.

The flight control computers 11 and 21, the difference calculation units 12 and 22, the actuators 13 and 23, the position sensors 14 and 24, and the like are configured and function in the same manner as those of FIG. 1.

Next, the operation will be described.

i) When the flight control computer 11 outputs the command signal C1 based on a command of an automatic flight control system 51, the difference calculation unit 12 subtracts the detection signal D2 of the position sensor 24 from the command signal C1, and supplies a result of the subtraction to the actuator 13 as the input signal E1. The actuator 13 tries to move the operation unit 15 to a position corresponding to the input signal E1. However, since the operation unit 15 is fixed, the body unit of the actuator 13 relatively moves, and additionally the body unit of the actuator 23 relatively moves, thereby causing the output end of the link mechanism 6 to be displaced. As a result, the steering mechanism 5 is finally driven via the link mechanism 4 by a displacement amount corresponding to the command signal C1.

ii) When the flight control computer 21 outputs the command signal C2 based on a command of an automatic flight control system 61, the difference calculation unit 22 subtracts the detection signal D1 of the position sensor 14 from the command signal C2, and supplies a result of the subtraction to the actuator 23 as the input signal E2. The actuator 23 moves the operation unit 25 to a position corresponding to the input signal E2, thereby causing the output end of the link mechanism 6 to be displaced. As a result, the steering mechanism 5 is finally driven via the link mechanism 4 by a displacement amount corresponding to the command signal C2.

iii) When the flight control computer 11 outputs the command signal C1 and the flight control computer 21 outputs the command signal C2, the total displacement amount Q of the operation units 15 and 25 is proportional to a value obtained by subtracting in real time the sum of the actual operation amounts D1 and D2 of the operation units 15 and 25, from the total of the command signals C1 and C2, and hence the steering mechanism 5 is finally driven by a displacement amount corresponding to the command signal C1 (or C2).

iv) Assuming that any portion of the first system ranging from the flight control computer 11 to the actuator 13 accidentally fails and the operation of the actuator 13 falls in hardover, the operation unit 15 falls into a state where the unit stops at the maximum displacement position in the positive or negative direction. On the other hand, even in such an event, the operation unit 25 can operate in accordance with the input signal E2 obtained by correcting the command signal C2 under monitoring a hardover of the operation unit 15 in real time. Accordingly the servo actuator is enabled to continue the normal operation only with the second system ranging from the flight control computer 21 to the actuator 23.

vi) Similarly, assuming that any portion of the second system ranging from the flight control computer 21 to the actuator 23 accidentally fails and the operation of the actuator 23 falls in hardover, the operation unit 25 falls into a state where the unit stops at the maximum displacement position in the positive or negative direction. On the other hand, even in such an event, the operation unit 15 can operate in accordance with the input signal E1 obtained by correcting the command signal C1 under monitoring a hardover of the operation unit 25 in real time. Accordingly the servo actuator is enabled to continue the normal operation only with the first system ranging from the flight control computer 11 to the actuator 13.

Figure 5:
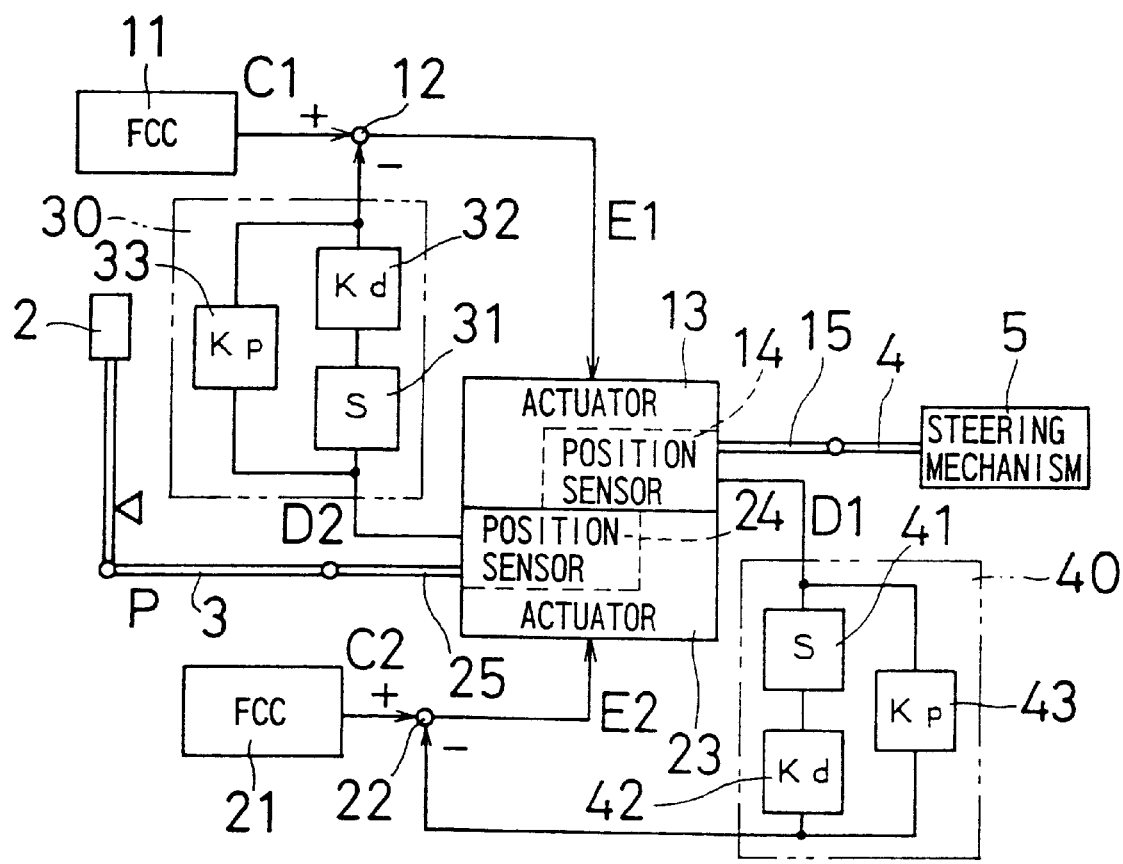
FIG. 5 is a block diagram showing a third embodiment of the invention.

FIG. 5 is a block diagram showing a third embodiment of the invention. Hereinafter, an example in which signal compensating circuits 30 and 40 including differential circuits 31 and 41 are respectively interposed between the position sensors 24 and 14 and the difference calculation units 12 and 22 will be described.

The control unit 2, the link mechanisms 3 and 4, the steering mechanism 5, the flight control computers 11 and 21, the difference calculation units 12 and 22, the actuators 13 and 23, the position sensors 14 and 24, and the like are configured and function in the same manner as those of FIG. 1.

The signal compensating circuit 30 comprises a differential compensating circuit including the differential circuit 31 and an amplifier 32 for setting a differential gain, and a proportional compensating circuit including an amplifier 33 for setting a proportional gain, and compensates the detection signal D2 of the sensor 24 with predetermined transmission characteristics. Similarly, the signal compensating circuit 40 comprises a differential compensating circuit including the differential circuit 41 and an amplifier 42 for setting a differential gain, and a proportional compensating circuit including an amplifier 43 for setting a proportional gain, and compensates the detection signal D1 of the sensor 14 with predetermined transmission characteristics.

Since the signal compensating circuits 30 and 40 are disposed as described above, the actuator 13 can hasten the own initial response in accordance with the operation rate of the operation unit 25, and the actuator 23 can hasten the own initial response in accordance with the operation rate of the operation unit 15, with the result that the operation of the servo actuator as a whole can have high response characteristics.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A servo actuator apparatus comprising:
   a first actuator for relatively displacing a first operation unit relatively with respect to a first body unit on the basis of an input signal E1;
   a first position sensor for detecting a position of the first operation unit with respect to the first body unit and outputting a detection signal D1;
   a second actuator for displacing a second operation unit relatively to respect to a second body unit on the basis of an input signal E2;
   a second position sensor for detecting a position of the second operation unit with respect to the second body unit and outputting a detection signal D2;
   a first difference calculation unit for subtracting the detection signal D2 of the second position sensor from an external command signal C1, and outputting the input signal E1; and
   a second difference calculation unit for subtracting the detection signal D1 of the first position sensor from an external command signal C2, and outputting the input signal E2,
   wherein a positive displacement direction of the first operation unit is reverse and series to a positive displacement direction of the second operation unit, and the first and second body units are integrally movable.

2. The servo actuator apparatus of claim 1, wherein differential circuits are respectively interposed between the second position sensor and the first difference calculation unit, and between the first position sensor and the second difference calculation unit.

3. An aircraft control apparatus comprising:
   a first actuator for displacing a first operation unit relatively to a first body unit on the basis of an input signal E1;
   a first position sensor for detecting a position of the first operation unit with respect to the first body unit and outputting a detection signal D1;
   a second actuator for displacing a second operation unit relatively to a second body unit on the basis of an input signal E2;
   a second position sensor for detecting a position of the second operation unit with respect to the second body unit and outputting a detection signal D2;
   a first difference calculation unit for subtracting the detection signal D2 of the second position sensor from a command signal C1 supplied from a first flight control computer, and outputting the input signal E1; and
   a second difference calculation unit for subtracting the detection signal D1 of the first position sensor from a command signal C2 supplied from a second flight control computer, and outputting the input signal E2,
   wherein a positive displacement direction of the first operation unit is reverse and series to a positive displacement direction of the second operation unit, and the first and second body units are integrally movable,
   wherein a control unit controlled by a pilot is coupled to one of the first and second operation units, and
   wherein another one of the first and second operation units is coupled to a steering mechanism for generating an aerodynamic control force.

* * * * *